(12) United States Patent
Stathis

(10) Patent No.: US 12,104,628 B2
(45) Date of Patent: Oct. 1, 2024

(54) FASTENER HOLE RESTORATION DEVICE

(71) Applicant: Shark Toolers, Morris Plains, NJ (US)

(72) Inventor: James Stathis, Morris Plains, NJ (US)

(73) Assignee: Shark Toolers, Morris Plains, NJ (US)

( * ) Notice: Subject to any disclaimer, the term of this patent is extended or adjusted under 35 U.S.C. 154(b) by 244 days.

(21) Appl. No.: 17/561,027

(22) Filed: Dec. 23, 2021

(65) Prior Publication Data

US 2023/0204061 A1    Jun. 29, 2023

(51) Int. Cl.
*F16B 13/12*    (2006.01)

(52) U.S. Cl.
CPC .......... *F16B 13/124* (2013.01); *F16B 13/128* (2013.01)

(58) Field of Classification Search
CPC ....... F16B 13/124; F16B 13/128; F16B 15/06
USPC ... 411/42, 71, 72, 74, 80.1, 80.2, 80.5, 80.6, 411/535, 451.1, 451.3, 451.5, 456
See application file for complete search history.

(56) References Cited

U.S. PATENT DOCUMENTS

| | | | | |
|---|---|---|---|---|
| 805,040 | A * | 11/1905 | Tomkinson | F16B 13/124 411/63 |
| 1,972,119 | A * | 9/1934 | Wernhardt | F16B 19/02 411/456 |
| 2,523,239 | A * | 9/1950 | Tinnerman | F16B 15/06 411/508 |
| 2,927,497 | A * | 3/1960 | Rapata | F16B 21/08 D8/393 |
| 3,094,892 | A * | 6/1963 | Topf | F16B 13/00 248/231.91 |
| 3,199,398 | A * | 8/1965 | Weisz | F16B 13/124 411/80.1 |
| RE28,227 | E * | 11/1974 | Elders | E21D 20/003 405/259.1 |
| 3,981,051 | A * | 9/1976 | Brumlik | A44B 18/0015 411/921 |
| 4,235,150 | A * | 11/1980 | Nony | F16B 13/12 411/908 |
| 4,708,552 | A * | 11/1987 | Bustos | F16B 13/126 248/231.91 |
| 5,145,301 | A * | 9/1992 | Yamamoto | F16B 13/141 411/72 |
| 5,332,153 | A | 7/1994 | Leibhard et al. | |
| 5,738,278 | A | 4/1998 | Franz et al. | |
| 9,587,662 | B2 | 3/2017 | Glass | |
| 10,125,533 | B1 * | 11/2018 | Stathis | E06B 1/68 |

(Continued)

FOREIGN PATENT DOCUMENTS

| | | | | |
|---|---|---|---|---|
| DE | | 860804 C  * | 12/1952 | |
| DE | | 3031047 A  * | 3/1982 | ............ F16B 13/124 |

(Continued)

*Primary Examiner* — Eugene G Byrd
*Assistant Examiner* — Jock Wong
(74) *Attorney, Agent, or Firm* — Baldini Law, LLC

(57) ABSTRACT

A small frangible device for repairing stripped or damaged holes for reinsertion of a screw or nail while reusing and maintaining the original properties of the fastener and capable of immediate use with minimal preparation. The device is characterized as having a generally elongated rounded exterior surface with a relatively narrow end and an opposite thicker end forming a tapering conical shape with a hollow interior and a textured outer surface further characterized by a plurality of non-contiguous, mis-aligned, raised, semi-spherical bumps.

4 Claims, 8 Drawing Sheets

(56) References Cited

U.S. PATENT DOCUMENTS

| | | | |
|---|---|---|---|
| 2016/0102696 A1* | 4/2016 | DeClark | F16B 13/128 411/60.2 |
| 2016/0102698 A1* | 4/2016 | Glass | F16B 13/002 411/393 |
| 2018/0372141 A1* | 12/2018 | King | F16B 13/126 |

FOREIGN PATENT DOCUMENTS

| | | | | |
|---|---|---|---|---|
| EP | 0995915 A2 | * | 4/2000 | F16B 15/06 |
| FR | 2694349 A1 | * | 2/1994 | F16B 13/124 |
| FR | 2766528 A1 | * | 1/1999 | F16B 13/00 |
| GB | 2567609 A | * | 4/2019 | F16B 13/04 |
| KR | 20200002134 U | * | 10/2020 | |
| WO | WO-02066845 A1 | * | 8/2002 | F16B 1/0071 |
| WO | WO-2017160152 A1 | * | 9/2017 | F16B 12/24 |

* cited by examiner

FASTENER HOLE RESTORATION DEVICE

FIELD OF THE INVENTION

Taught here is a small frangible fastener hole restoration device for repairing stripped or damaged holes for reinsertion of a screw or nail while reusing and maintaining the original properties of the fastener and capable of immediate use with minimal preparation.

BACKGROUND

It is commonplace in construction to use screws or nails to fasten together two items, such as for example, fastening a hinge to a door frame or fastening a towel rack to a wall. It is also commonplace for such fastener attachment to wear from the stress of the use of the thing attached, or from unfastening and refastening for various reasons. The most common thing to happen is the hole in which the fastener is inserted becomes stripped, worn, enlarged, or otherwise incapable of securely holding the screw or nail (which may still be in good shape itself). There have been many attempts at fixing this issue. For example, wood putty can refill a hole in wood. In that case, it only works on wood, not on drywall, and it takes some preparation and drying time. Various glues have been used, but that makes the fix 'permanent' and incapable of unfastening without destroying the application to an even greater extent.

There have been other attempts. For example, U.S. Pat. No. 5,332,153 titled SLEEVE FOR INCREAING RETENTION VALUE OF A SCREW, discloses, "the retention value of a screw previously inserted into a wooden railroad tie is increased by an axially extending sleeve having an external thread and an internal thread. The thread revolutions of the internal thread are offset axially by half the thread pitch of the external thread. Due to this offset of the threads, the screw is positioned in the sleeve so that its threads are located between the external thread revolutions affording a new retention, while the external thread seats within the thread previously formed in the wooden railroad tie by the screw." Firstly, this application is for large applications, specifically directed to railroad ties, and would be inapplicable to small household hinge screws and completely inapplicable to nails that have no threads. Moreover, this approach rehabilitates the screw, not the hole.

In another example, U.S. Pat. No. 5,738,278 titled ANCHOR SLEEVE FOR COMPOSITE ANCHORS AND METHOD OF PREPARING CORROSION-RESISTANT ANCHORAGES, discloses, "an anchor sleeve for a composite anchor is threaded in its inside surface and is anchored by at least one of an organic and inorganic mortar in a borehole formed in a concrete tie for rails or in a similar receiving material. The inside threaded sleeve forms a load engagement means for an attachment member and is located in a trailing end region of the sleeve. The sleeve has two concentrically and consecutively arranged sealing elements at an opposite leading end of the sleeve and the sealing elements close off the leading end of the sleeve in a liquid-type manner. The sealing elements can be consecutively displaced out of sealing engagement at the leading end of the sleeve. In addition, a method for corrosion resistant anchorages employs the anchor sleeve." Here, there is similarly a large scale application, not for small household hinge and bracket attachments, and here, there is permanent fixation, like the use of a glue.

Finally, in another example, and perhaps the closest known reference to the instant disclosure, U.S Pat. No. 9,587,662 titled, THREADED FASTENER HOLE REPAIR APPARATUS, discloses, "a threaded fastener hole repair apparatus for repairing a stripped target screw hole so that the desired screw can once again be secured therein comprises an elongated, conical fastener sleeve having a threaded exterior surface and a substantially hollow, conical interior. The elongated fastener sleeve is made up often discrete breakaway portions, defined as a single proximal end section and nine sleeve sections, with each separated by a circumferential score in the fastener sleeve, thereby allowing the fastener sleeve to be resized by snapping off breakaway portions a desired point. The substantially hollow, conical interior of the fastener sleeve includes four elongated flaps which run in a narrowing manner along the wall of the conical interior in the fastener sleeve, providing an additional surface inside the conical interior of the fastener sleeve to mesh with the threads of the screw being inserted into the fastener sleeve." While addressing the need of fixing a stripped or damaged fastener hole in a common household application and even also having the breakaway scores to fit the apparatus into various size holes, this device is only applicable to screws and has outer threads that must itself be screwed into the existing damaged screw hole (not applicable to nail holes) that requires torque to be applied to it.

None of the foregoing references, alone or in combination, teach the salient and proprietary features or construction of the present disclosure, and as such, fail to be useful as a stripped or damaged fastener hole restoration device comprising an elongated, conical fastener sleeve having a non-threaded exterior surface and a substantially hollow core capable of use with both screw holes or nail holes, useful in both wood and drywall applications, and without requiring the device to be screwed into place, but rather simply pushed or lightly tapped into place, broken off at the appropriate score point, and instantly ready to have a fastener inserted (with capability of unfastening and refastening in the future).

The present disclosure teaches several embodiments that provide a very convenient, inexpensive, small fastening hole restoration device comprising a sleeve with an overall conical shape, narrower at one end, and enlarging as it extends to its opposite end, scored at increments along its length allowing it to break evenly at pre-determined spots, having texture and bumps strategically placed on its exterior surface for gripping power, but not helically placed allowing it to be inserted directly without any screwing or torque force applied; and having a hollow interior allowing for expansion when the pre-existing screw or nail is inserted into the hollow.

SUMMARY

The present disclosure teaches embodiments of a device to repair or restore a stripped or damaged fastener hole enabling the same fastener to be re-used with at least the same fastening force as was originally present. In a preferred embodiment, the device taught here comprises: an elongated, conical fastener sleeve having a non-threaded exterior surface and a substantially hollow core, a plurality of circumferential scores around its exterior providing breakability at pre-defined points along its length, added texture and non-contiguous, semi-spherical bumps added to its exterior at pre-defined points such that when inserted into a hole, and the pre-existing screw or nail is inserted, the sleeve expands pushing the texture and bumps further into the hole walls securing the device in place, and an end nub section provided to facilitate pushing or tapping the device into the hole to be fixed.

The present disclosure teaches embodiments that utilize existing materials configured in such a way as to provide: an elongated, conical, hollowed sleeve; said sleeve having an external surface comprising a textured surface with added non-contiguous, semi-spherical bumps at pre-defined points; said sleeve interior being hollow to accept a screw or nail; said sleeve tapering from a substantially pointed insertion end to a circumferentially wider pushing end and said pushing end further comprising a relatively thicker ring nub configured to allow the device to be pushed or hammered into the hole to be fixed; and said sleeve comprising a plurality of circumferential scores at predefined points along its length providing break points. The overall sleeve is crafted from a material chosen for both strength and pliability such that it pushes, taps or hammers into place without significant deformation, is breakable at a score just past the surface of the hole into which it is inserted, and also pliable enough to allow for slight expansion when the screw or nail is inserted without breaking or cracking.

In one embodiment, the sleeve described herein is conical with a tapering circumference and with a hollowed conical interior.

In one embodiment, the sleeve described herein may be squared in shape, but still tapering with a hollowed conical interior.

In one embodiment, the sleeve described herein may be substantially a point at a first end and tapering increasing in diameter as it progresses to its opposite thicker end.

In one embodiment, the sleeve described herein may have circumferential scores configured to allow the sleeve to break off and separate into two distinct components at pre-defined spots along its length.

In one embodiment, the sleeve described herein may have at its thicker or wider end, a nub configured to provide a surface in which to push, tap, or hammer the sleeve into a hole.

In one embodiment, the sleeve described herein may have a nub disposed at the thicker end for facilitating pushing the sleeve into a hole and said nub may be solid or have a hole through it.

In one embodiment, the sleeve described herein, may have a solid component at its narrower, pointy end, to facilitate insertion into a hole without crushing. In one embodiment, this solid component may start at the very end, or it may be placed somewhere along the length of the device. In one embodiment, there may be two solid components, one at the very narrow end, then have a few circumferential scores, then have a second solid component, then more circumferential scores. In one embodiment, the sleeve described herein, may have any number of alternating solid components, and grouping of circumferential scores. A solid component may in some embodiments mean that only there are no circumferential scores along a portion of the sleeve, but it is still hollow in its interior, while in other embodiments, the entire section may be solid.

In one embodiment, the sleeve described herein, may be textured on its outer surface area to provide a greater coefficient of friction and gripping ability when inserted into a hole.

In one embodiment, the sleeve described herein, may further contain raised bumps, non-contiguous and semi-spherical, at pre-defined spots along its length to provide even greater gripping ability when inserted into a hole.

In one embodiment, the sleeve described herein, may be constructed of a material that has inherent properties of strength, so that it will not crush or substantially deform during the process of insertion into a hole, but also have some inherent pliability so that when a screw or nail is inserted after the device is in position in a hole, it will expand slightly, without breaking apart, to tighten inside the hole into which it is inserted.

In one embodiment, the sleeve as described herein can be made from recycled materials.

DETAILED DESCRIPTION

Figure 1:
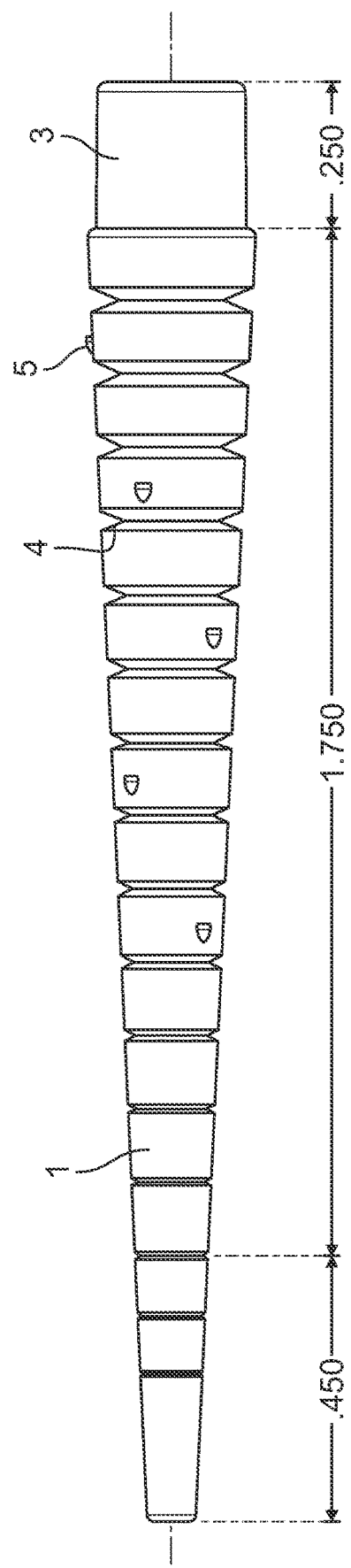
FIG. 1 depicts one embodiment of the present disclosure showing a side view of the exterior surface of a fastener hole restoration device showing a smaller insertion end, and opposite larger end capable of pushing the device into a damaged fastener hole, and concentrically descending rings with scores capable of breakage at pre-determined points.
Figure 2:
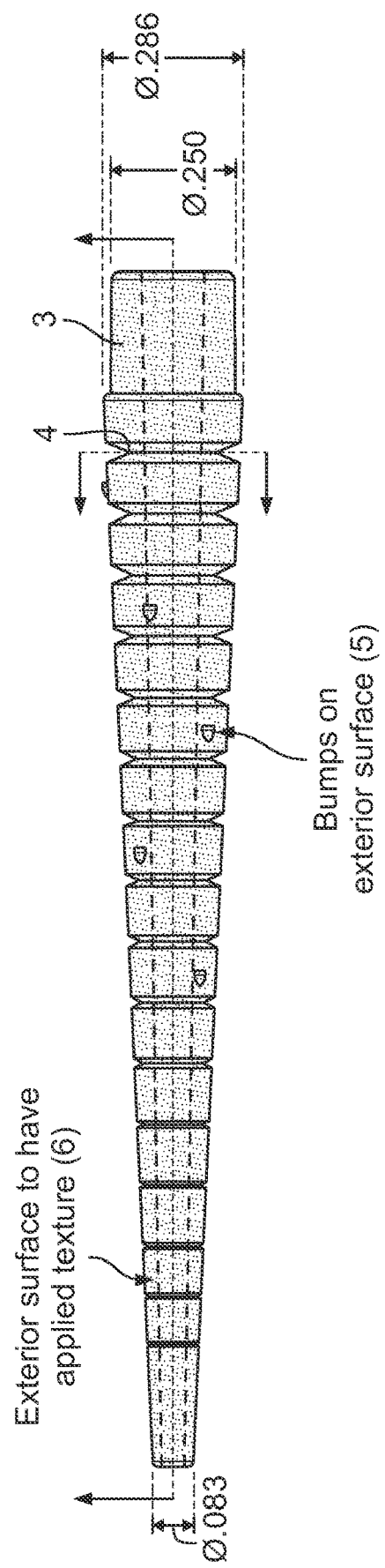
FIG. 2 depicts one embodiment of the present disclosure showing a similar side view of the exterior surface of a fastener hole restoration device as in FIG. 1, but indicating placement of exterior surface texture and added bumps.
Figure 3:
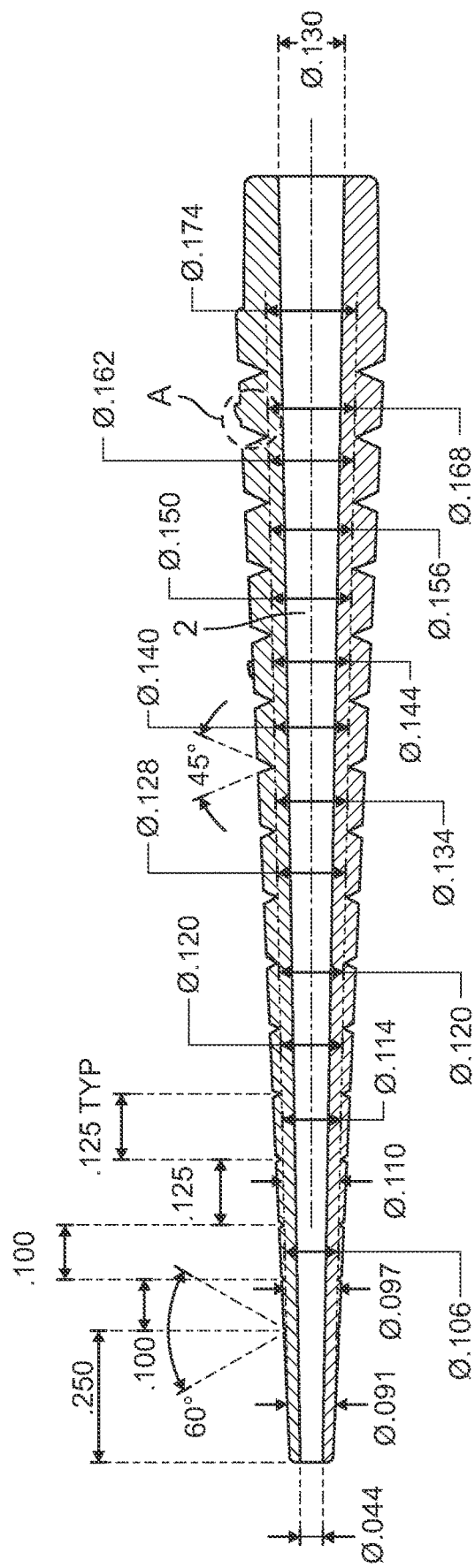
FIG. 3 depicts one embodiment of the present disclosure showing a cutaway view of a fastener hole restoration device showing various preferred dimensions for both exterior and internal surfaces and the tapering of the device. There is also indicated a circular section (A) where there is a bump placement that will have an exploded view in FIG. 4.
Figure 4:
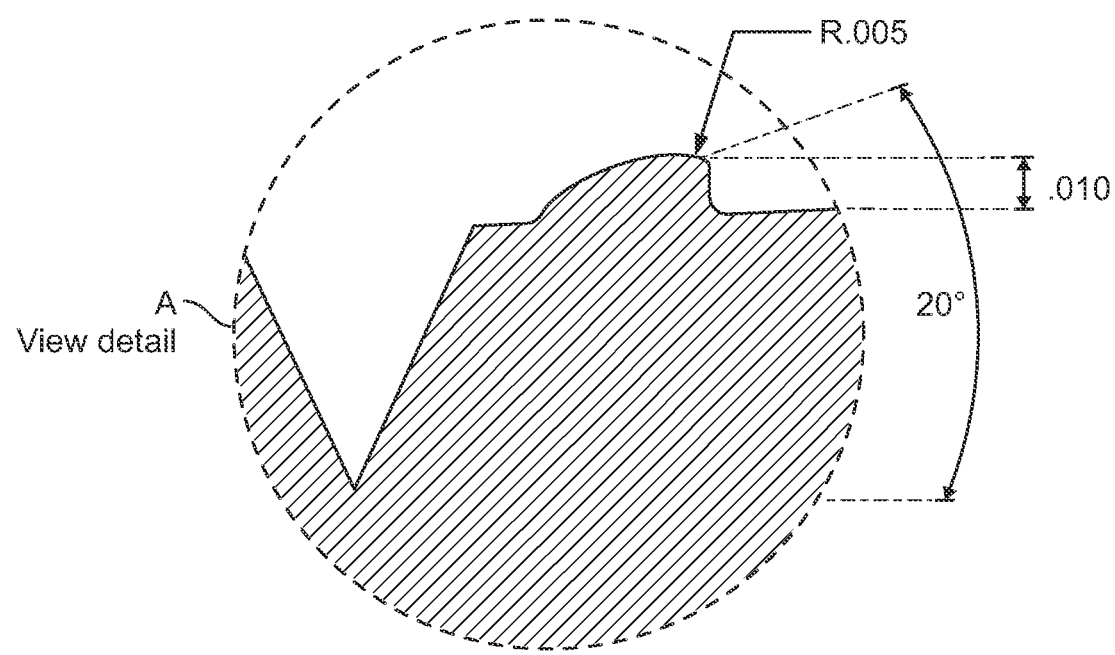
FIG. 4 depicts one embodiment of the present disclosure showing the exploded view of circle (A) from FIG. 3, showing dimensions of a preferred embodiment for the addition of bumps on the exterior surface of a fastener hole restoration device.
Figure 5:
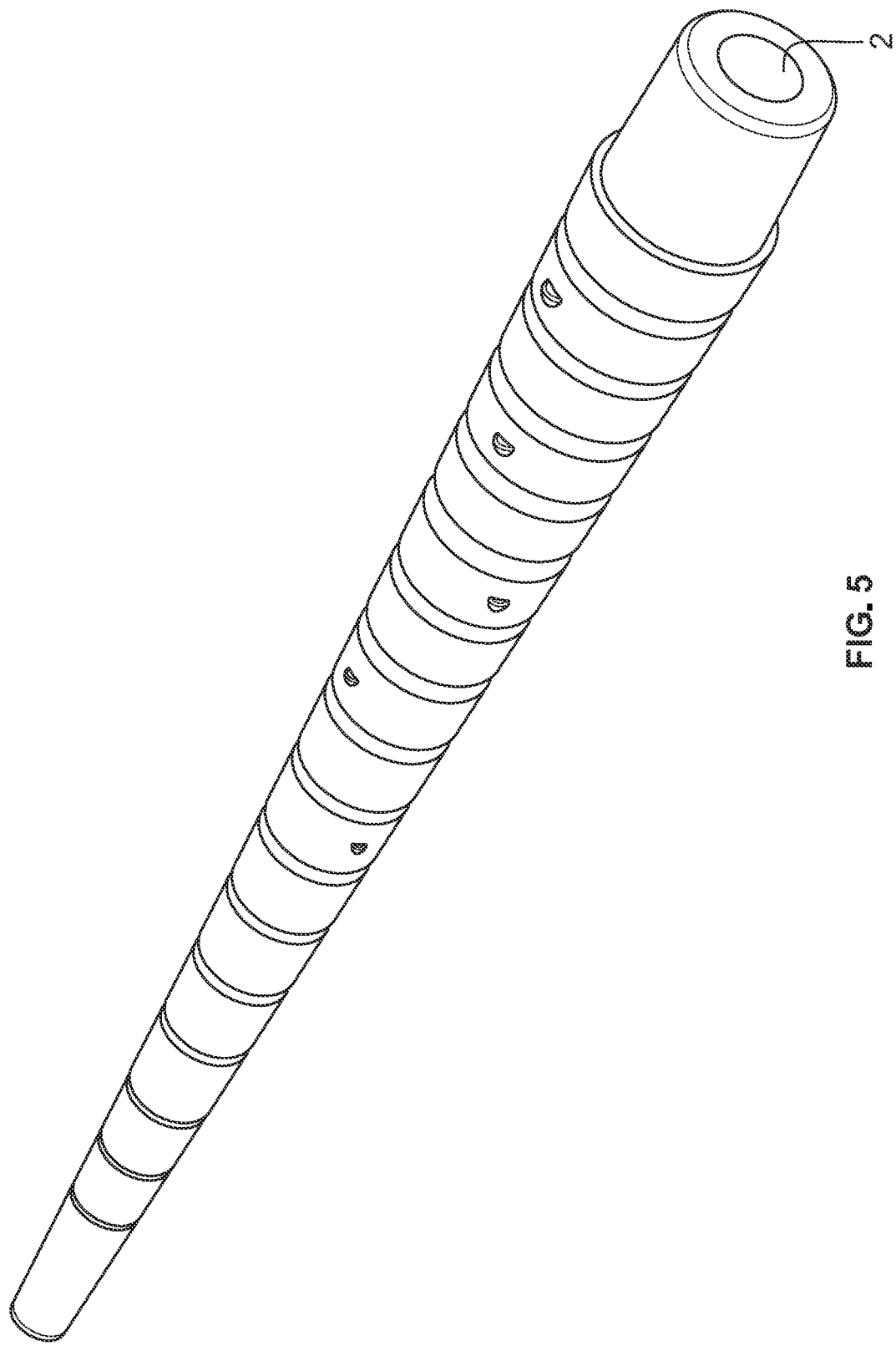
FIG. 5 depicts one embodiment of the present disclosure showing a perspective shaded view of an overall depiction of a fastener hole restoration device.

For clarity of disclosure, and not by way of limitation, the detailed description of the invention is divided into the following subsections that describe or illustrate certain features, embodiments or applications of the present invention.

Definitions

"sleeve" as used herein means a fastener hole restoration device characterized by comprising an elongated, tapering, hollow-core spike configured to insert into a hole left by a nail or screw that was inserted into a construction material and configured to provide a filler material for said hole and to accept re-insertion of the nail or screw that originally made the hole.

"circumferential score" as used herein means a removed portion of material from along the length of a sleeve that provides a natural breakage point wherein the sleeve will snap off in a substantially clean break when sufficient pressure is applied.

"nub" as used herein means a protruding member from the thick end of the sleeve that is substantially stiffer, thicker, and as a result, stronger from the rest of the thick end of the sleeve and configured to provide a point at which the user can use to manipulate, guide and insert sleeve in deployment, including pushing, tapping, and hammering. It also can serve to grip the sleeve for leverage in breaking at a circumferential score.

"frangible" as used herein means the properties of the sleeve wherein it is not truly elastic, but is easily and cleanly breakable at a circumferential score and also pliant enough so that it can expand in place without breaking or substantially deforming creating a tight fit in a hole when a screw or nail is re-inserted.

"raised bump" as used herein means a relatively small protrusion of material disposed on the external surface of the sleeve configured to be mostly semi-spherical, but with an edge formed on its section nearer to the thicker end of the sleeve designed to 'catch' on a surface against which it slides, and purposefully aligned down its length, section to section or mis-aligned within each section so as not to be capable of acting as screw threads, and not to significantly inhibit the direct pushing and insertion of the sleeve into a target hole, and acting as gripper bumps only when pressure is exerted from the interior hollow portion expanding the outer surface tightly in the target hole.

The Device and Method of using the Device of the Present Invention

A typical fastener sleeve as described herein is formed having a generally rounded exterior surface (1), a substantially hollow conical interior core (2), and having a first relatively narrower end, a second opposite and relatively thicker end, wherein the fastener sleeve is configured to be selectively shortened to fully fit inside a target fastener hole.

A typical fastener sleeve as described herein will further be characterized by an exterior surface (1) and a hollow, generally conical interior (2), each tapering in decreasing diameter from the second opposite relatively thicker end to the first relatively narrower end.

A typical fastener sleeve as described herein will further be characterized by a nub section (3) disposed on its second opposite thicker end and a plurality of circumferential scores (4) extending sequentially to the first relatively narrower end configured to allow the fastener sleeve to be snapped into two pieces at the location of one of any of the circumferential scores.

A typical fastener sleeve as described herein will further be characterized by a textured surface (6) on the exterior surface and said exterior surface further comprising a plurality of non-contiguous, raised, semi-spherical bumps (5) between at least some of said circumferential scores.

It is important to note that the raised bumps (5) configured for disposal on the exterior surface of the fastener sleeve described herein as relatively small and partially semi-spherical in nature, but with an edge on the part of the bump nearer the thicker end of the sleeve designed to catch on the surface against which it slides only when it slides 'against the grain', that is, in the direction that the edge is facing. Moreover, they are disposed along the length of the exterior surface in a manner such that they are not configured to be screw threads, and would resist having the device be screwed into place, and are rather designed for the fastener sleeve to be pushed, tapped, or hammered into a target hole with the raised bumps providing relatively little resistance to such insertion method, but once tightly into the target hole, and the fastener (either a nail or screw) being inserted, the raised bumps randomly around the exterior surface, and non-contiguously placed, then provide expansion tension in the target hole to prevent the sleeve from slipping back out. Because one side of the bumps (the part nearer the thinner end of the sleeve) are rounded and smooth, the raised bumps glide into a hole easily, but because their opposite side have a slight edge (the part nearer the thicker end of the sleeve), they catch the surface against which they glide making them harder to pull out of the hole, and especially when they expand in place.

Figure 6:
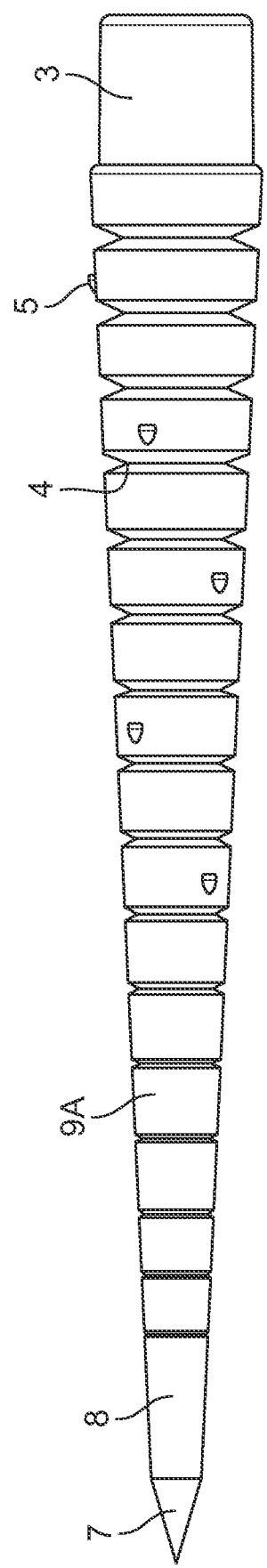
FIG. 6 depicts one embodiment of the present disclosure showing a side view of the exterior surface of a fastener hole restoration device showing a substantially pointed first end, with a next solid component, followed by circumferential scores and then a second solid section followed by additional circumferential scores.
Figure 7:
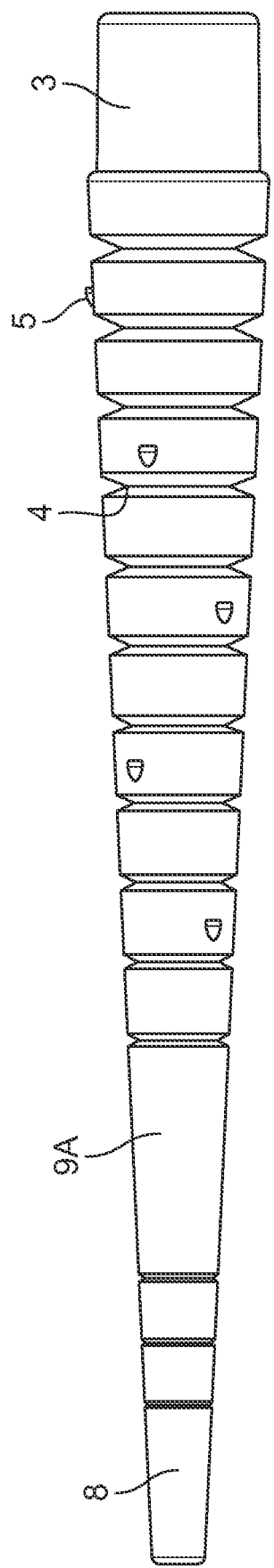
FIG. 7 depicts one embodiment of the present disclosure showing a side view of the exterior surface of a fastener hole restoration device showing two solid sections separated by a section of circumferential scores.
Figure 8:
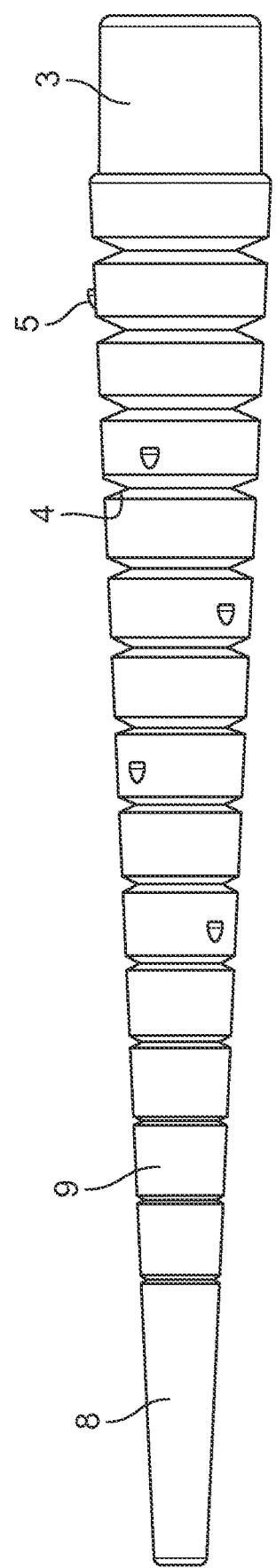
FIG. 8 depicts one embodiment of the present disclosure showing a side view of the exterior surface of a fastener hole restoration device showing one solid component section at its beginning narrow end, followed by circumferential scores until its opposite, thicker, nub end.

A typical fastener sleeve as described herein will be characterized by having a fairly narrow, almost pointy, first thinner end for insertion into a fastener hole. This narrow end may in some embodiments actually be a solid point (7), or just have a narrow solid end (8). The sections between each circumferential score (9) may be uniform in linear dimension along the length of the sleeve, or there may be some such sections that are longer to provide stability in certain applications (see FIGS. 6-8 and components 9 and 9A).

EXAMPLES

The present invention is further illustrated, but not limited by, the following examples.

A typical use of the fastener sleeve hole restoration device as described herein is for example, when the hinge on a cabinet door, as a result of the forces of use over time, becomes loose. The forces may tend to pull on the screws holding the hinge in place which over time can deform the hole into which the screw is inserted. A larger screw may be inserted, but over time, this is going to likely suffer the same fate. The hole may be repaired with wood putty, but this method takes time and also may not work effectively as the interior may be damaged such that the piece of wood putty when dried may simply pull out or not create a great bind for reinsertion of the same screw. Similar fates can happen to a wise variety of screws or nails (picture hooks in wall board, electrical outlet covers, door frame nails, cabinets, furniture, the list is truly endless where such application may be warranted). Here, with a sleeve as described herein, remove the screw or nail, simply push or tap the sleeve into the damaged hole and when fully inserted, snap off at the circumferential score just immediately below the surface of the hole, and then re-insert the screw or nail. The sleeve will expand from the volume of the screw of nail filling in the interior hollow of the sleeve, pushing the bumps further into the hole surface, and a tight fit will be achieved.

Optimal dimensions in inches are shown in FIGS. 1-4 for various components of a preferred embodiment as described herein. However, the salient teachings as described herein may warrant a smaller or bigger sleeve for non-typical applications.

A typical fastener hole restoration device as described herein will be manufactured from a hard rubber or plastic, that has characteristics of strength and pliability.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A device for restoring damaged fastener holes in a medium comprising:
    a fastener sleeve having an exterior surface, a substantially hollow interior, a first narrow end, a second opposite thick end, wherein the fastener sleeve is configured to be selectively shortened to fully fit inside a target fastener hole;
    wherein the exterior surface and the hollow interior each taper in decreasing diameter from the second opposite relatively thick end to the first narrow end;
    wherein the fastener sleeve comprises a nub section disposed on its second opposite thick end and a plurality of circumferential scores extending sequentially to the first narrow end configured to allow the fastener sleeve to be snapped into two pieces at a location of any of one chosen circumferential score;
    wherein the fastener sleeve comprises a textured surface on the exterior surface and said exterior surface further comprising a plurality of randomly placed, non-contiguous mis-aligned semi-spherical raised bumps substantially along an entire length of the exterior surface.

2. The device of claim 1, wherein the device is made from a single material of plastic or hard rubber.

3. A device for restoring damaged fastener holes in a medium comprising:
    an elongated fastener sleeve having an exterior surface, a substantially hollow interior, a first narrow end, a second opposite and thick end, wherein the exterior surface is conical shaped from the first narrow end to the second opposite and thick end and the substantially hollow interior is defined by a tapering conical shape, and the fastener sleeve is configured to be selectively shortened to fully fit inside a target fastener hole;
    wherein the fastener sleeve comprises a nub section disposed on its second opposite and thick end and a plurality of circumferential scores extending sequentially to the first narrow end configured to allow the fastener sleeve to be snapped into two pieces at the location of any of one chosen circumferential score;
    wherein the fastener sleeve comprises a textured surface on the exterior surface and said exterior surface further comprising a plurality of randomly placed, non-contiguous mis-aligned semi-spherical raised bumps substantially along an entire length of the exterior surface.

4. The device of claim 3, wherein the device is made from a single material of plastic or hard rubber.

* * * * *